(12) United States Patent
Flanagan

(10) Patent No.: US 7,596,903 B1
(45) Date of Patent: Oct. 6, 2009

(54) LANDSCAPE EDGING SYSTEM

(76) Inventor: Michael Shane Flanagan, P.O. Box 1214, Bowling Green, KY (US) 42104

(*) Notice: Subject to any disclaimer, the term of this patent is extended or adjusted under 35 U.S.C. 154(b) by 430 days.

(21) Appl. No.: 11/361,735

(22) Filed: Feb. 24, 2006

(51) Int. Cl.
*A01G 1/08* (2006.01)
(52) U.S. Cl. ............................................. 47/33; 52/102
(58) Field of Classification Search ............ 47/33; 52/102
See application file for complete search history.

(56) References Cited

U.S. PATENT DOCUMENTS

| | | | |
|---|---|---|---|
| 3,803,760 A | | 4/1974 | Matvey |
| 4,831,776 A | | 5/1989 | Fritch |
| 5,092,076 A | * | 3/1992 | Terreta .............................. 47/33 |
| 5,212,917 A | * | 5/1993 | Kurtz et al. ...................... 52/102 |
| 5,414,956 A | * | 5/1995 | Kheradpir ......................... 47/33 |
| 5,426,888 A | | 6/1995 | Gnaedig |
| 6,324,783 B1 | * | 12/2001 | McIntyre et al. ................ 47/33 |
| 6,341,445 B1 | | 1/2002 | Morrison |
| 6,449,897 B1 | | 9/2002 | Gaston |

* cited by examiner

*Primary Examiner*—T. Nguyen
(74) *Attorney, Agent, or Firm*—Alexander Brackett; Middleton Reutlinger

(57) ABSTRACT

A landscape edging system comprises a plurality of molded interlocking edging pieces each having a face portion having top and bottom edges and an integral interlocking flange and a relief portion adjacent the face portion and set in relief therefrom. When installed, the interlocking flange of one edging piece engages the relief portion of an adjacent edging piece to provide a uniform aesthetic appearance.

13 Claims, 6 Drawing Sheets

LANDSCAPE EDGING SYSTEM

FIELD OF THE INVENTION

The instant edging system relates generally to a landscape edging system and specifically to a landscaping edging system having a plurality of nesting and interlocking component pieces that are readily secured to each other to create a continuous, secure and economical landscape edge. The present system employs a plurality of individual edging pieces that may be arranged in a wide variety of shapes to accommodate various areas being landscaped.

BACKGROUND OF THE INVENTION

Prior art landscape edging systems of varying designs and complexities have been employed to segregate one area of a yard or garden from an adjacent but dissimilar area. Often it is desirable to separate these areas on the basis of visual appearance, landscape scheme, or variety of vegetation. One common use of landscape edging systems is the separation of an area requiring frequent trimming or mowing, such as grass, from a flowered or mulched area used to group vegetation or ground cover. Often these prior art landscape edging systems permit a lawn mower deck of edger to be used such that the mower deck or edger actually contacts the landscape edging without causing damage thereto, while the landscape edging protects the vegetation, mulch or ground cover from the trimming apparatus.

There are many commercially available landscape edging systems including wooden barriers such as logs, railroad ties or beams, metal separators, plastic strips, clay forms, stone, brick and brick pavers of various shapes and sizes. Each of these systems is adequate to separate disparate landscape areas when carefully installed. However, these systems are not typically easy to install, are ill-suited for defining irregular shapes such as curves, and are often quite expensive. Additionally, many of theses prior art systems are quite heavy and are difficult for many to install. Furthermore, many prior art systems do not form a coherent whole, as the individual pieces comprising such systems are readily displaced from one another upon impact from a foot, gardening tool or mower, for example.

SUMMARY OF THE INVENTION

The instant edging system obviates the aforementioned problems by providing a landscape edging system having a plurality of edging pieces that are readily secured together as a unitary landscape border and are also capable of being installed to describe curves and irregularly shaped edges. The individual edging pieces that comprise the edging system include a portion or portions that are exposed when in place that may be contoured, colored or textured as desired to accommodate various landscaping aesthetic schemes.

The individual edging pieces of the present landscape edging system also incorporate and articulated joint mechanism to secure adjacent edging pieces together while permitting relative motion between adjacent edging pieces and allowing the pieces to closely match the desired landscape edge shape. To that end, each individual edging piece incorporates a relief area over which a protruding portion or flange of the face of an adjacent edging piece may overlap, thereby permitting the pieces to be placed in non-linear arrangements while still maintaining the desired aesthetic appearance of the edging face portions.

A plurality of edging piece shapes may be employed including, but not limited to end pieces, inside and outside corners, curved sections, and straight section. Individual edging pieces are advantageously comprised of polypropylene plastic, or an equivalent lightweight, durable molded plastic. The individual edging pieces of the instant edging system may incorporate a detachable anchor or stake that is readily molded integrally with each edging piece by modern manufacturing technique. Furthermore, each edging piece may include an anchor tab having an aperture therein through which the detachable anchor may be inserted to securely anchor each edging piece in the ground.

Other features, objects and advantages of the instant edging system will become readily apparent from the detailed description of the preferred embodiments herein below, taken in conjunction with the appended drawing Figures.

BRIEF DESCRIPTION OF THE DRAWING FIGURES

DETAILED DESCRIPTION OF THE PREFERRED EMBODIMENT(S)

Figure 1:
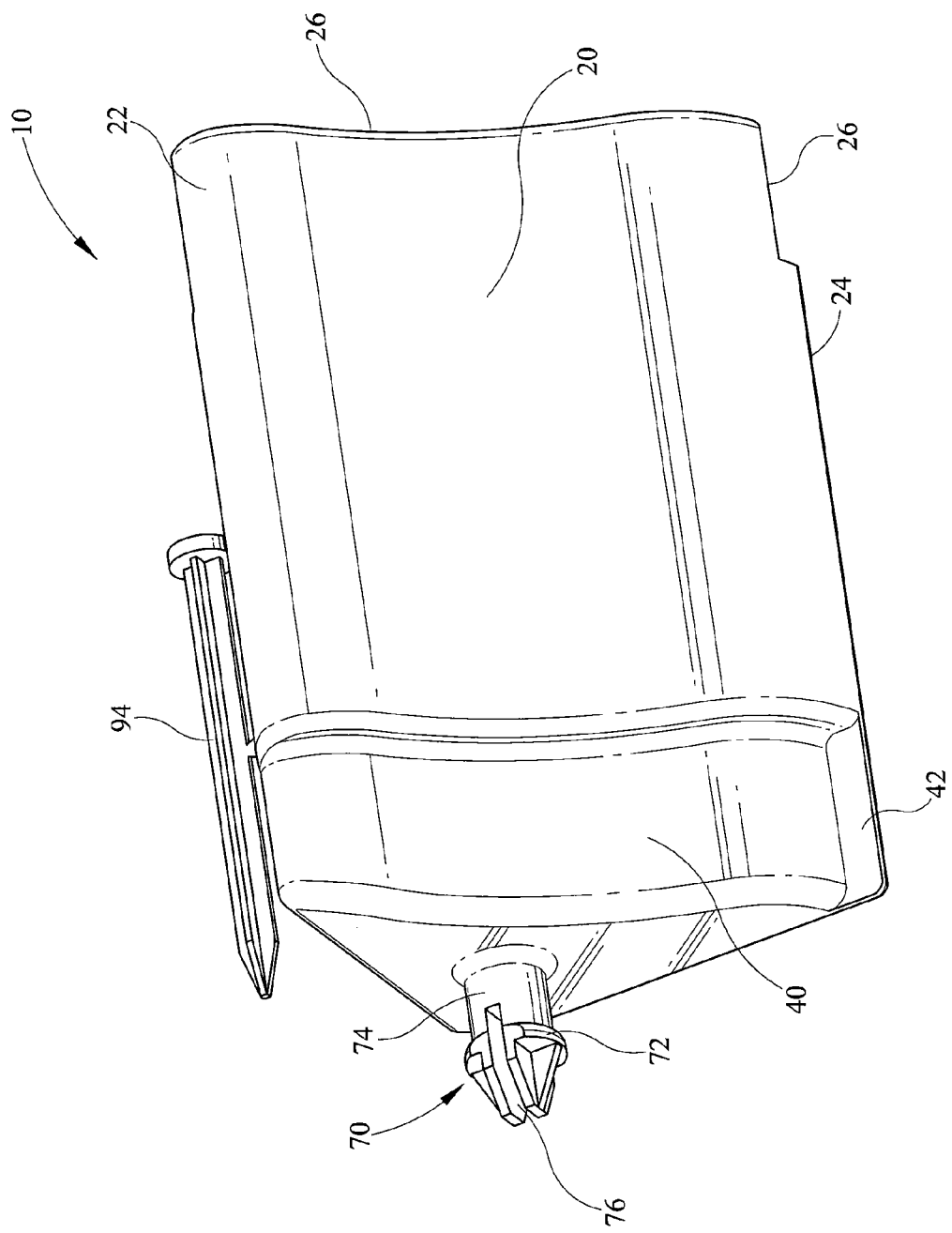
FIG. 1 is an isometric view of a landscape edging piece in accordance with one embodiment of the edging system.
Figure 2:
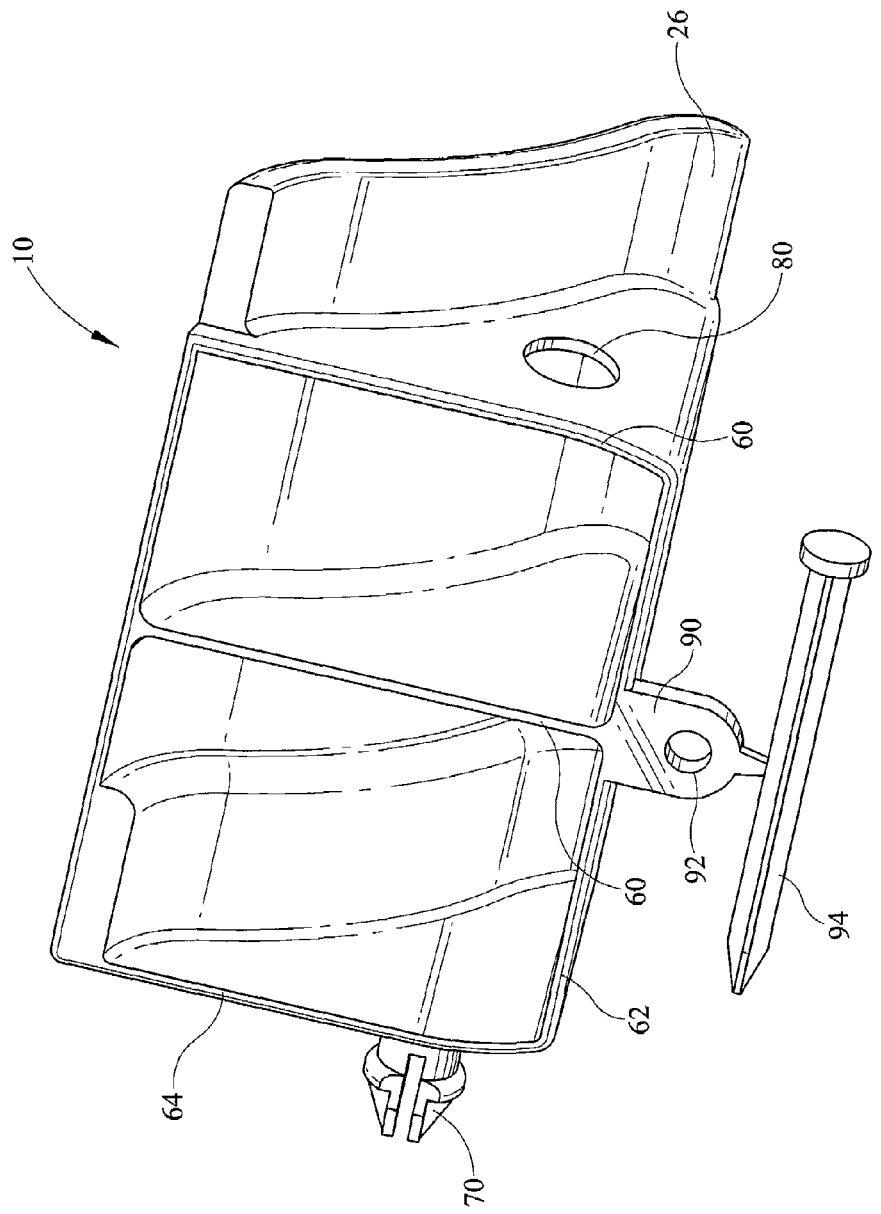
FIG. 2 is an isometric view of a landscape edging piece in accordance with one embodiment of the edging system.

Referring now to drawing FIGS. 1 and 2, and in accordance with a preferred constructed embodiment of the system, a landscape edging system comprises a plurality of landscape edging pieces 10, each of which includes a face portion 20 and which may include top and bottom edges 22 and 24 respectively as well as an interlocking flange 26 that is integral to face portion 20 to present a uniform appearance across the width of face portion 20.

Each edging piece 10 further comprises a relief portion 40 disposed adjacent to but recessed or relieved from face portion 20 and terminating at a lower portion in base lip 42 proximate bottom edge 24. Relief portion 40 is contoured in a similar fashion to face portion 20 and integral interlocking flange 26 so that the interlocking flange 26 from an adjacent edging piece readily overlaps relief portion 40 as two edging pieces 10 are secured together, as will be discussed further herein below.

It should be noted that face portion 20 and relief portion 40 may have many different contours as necessitated by a given landscaping application. As shown in the drawing Figures, face portion 20 and relief portion 40 comprise a concave portion terminating in rounded top and bottom edges 22 and 24 respectively. However, it is readily seen that face portions 20 and relief portion 40 may be shaped in a wide variety of configurations to present a plurality of varied aesthetic appearances. For example, face portion 20 and relief portion 40 may be convex to mimic the appearance of a rounded stone and may further have a textured surface.

The edging pieces 10 of the instant edging system may be molded out of a commercially available plastic composition, for example polystyrene or polypropylene, or any one of a wide variety of plastic compositions that are capable of being molded, and that are relatively light, durable, and resistant to the elements. Accordingly, the edging pieces 10 in accordance with one embodiment of the instant edging system are molded such that each piece 10 including face portion 20 and relief portion 40 are formed in a variety of textures and with a variety of colors. This feature of the system provides a landscape edging system that may be configured for a plurality of individual motifs, as required for an individual landscaping application.

Referring now to FIG. 2, edging piece 10 may include a plurality of supports 60 that are integrally molded with edging piece 10. The supports 60 extend downwardly from the undersides of face portion 20 and relief portion 20 to support and stabilize edging piece 10 when placed on the ground. Supports 60 may terminate in a rear portion 62 that extends from rear supports 60 to edge 22 of face portion 20. Rear portion 62 acts to close off the rear of edging piece 10 such that mulch or soil may be placed against rear portion 62 to assist in holding edging piece 10 in place and creating a smooth transition from one landscape area to another, since the primary portion of the edging piece that will remain visible when installed is face portion 20.

Supports 60 may further comprise a pair of side portions 64, one of which is located proximate interlocking flange 26 and extends between face portion 20 and rear portion 62. Side portions 64 are arranged in opposed spaced relation and are generally parallel to each other. One of said side portions 64 includes a joint 70 extending outwardly therefrom while the opposed side portion 64 has a joint aperture 80 therein that is designed to receive joint 70 from an adjacent edging piece 10.

Joint 70 may be provided in a variety of configurations capable of articulation when received in aperture 80, such as a ball joint or radial joint. In one embodiment of the edging system joint 70 comprises a circular flange 72 disposed on a post 74 having a slot 76 therein. Circular flange 72 has a diameter slightly larger than that of joint aperture 80. Slot 76 bisects circular flange 72 and post 74 such that circular flange 72 may be slightly compressed to reduce its diameter. When installing two edging pieces together, circular flange 72 is slightly compressed due to the presence of slot 76, thence readily inserted through aperture 80. Once inserted, circular flange 72 expands to its original diameter, prohibiting it from inadvertently sliding back through aperture 80 thereby securing adjacent edging pieces together.

Figure 3:
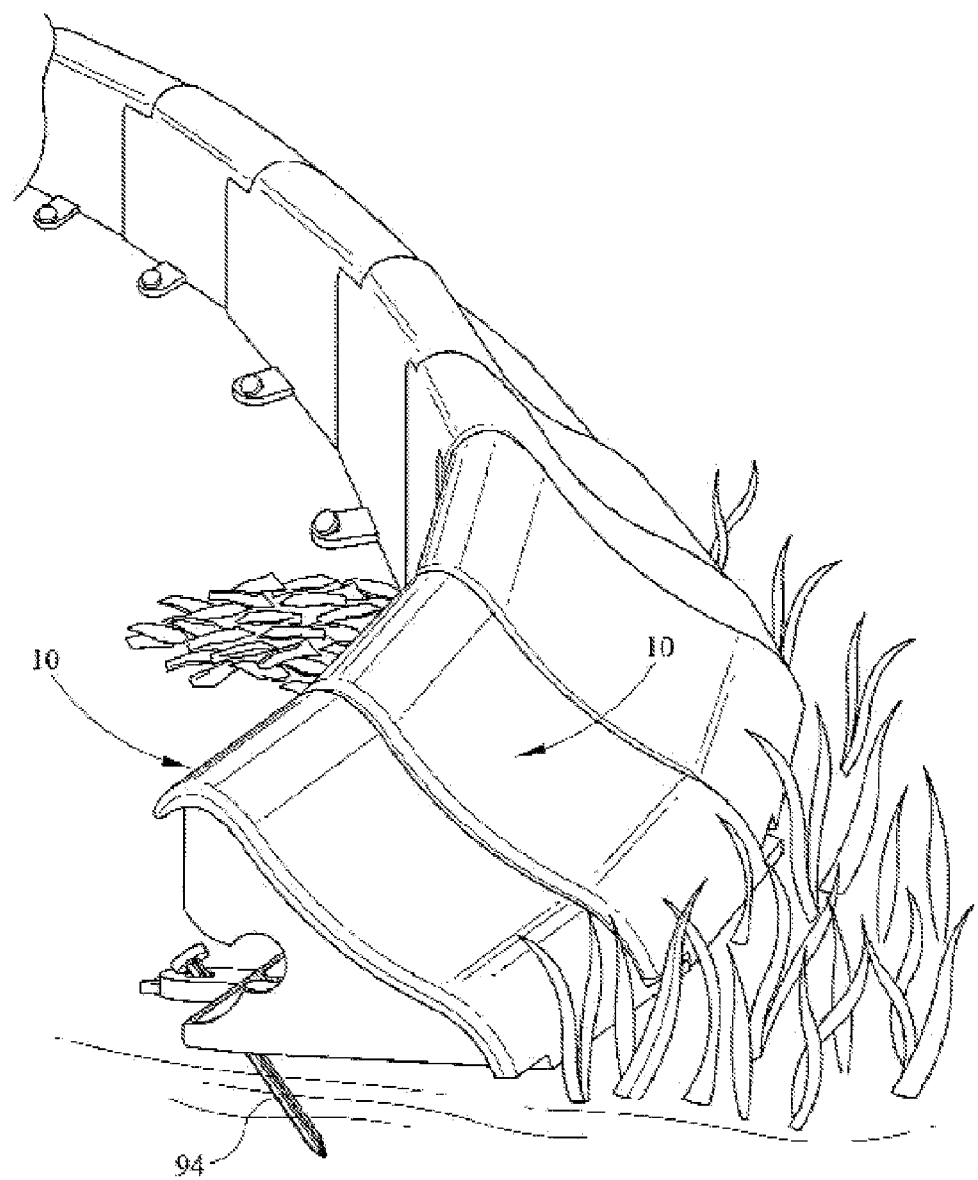
FIG. 3 is an isometric view of a plurality of assembled edging pieces in accordance with one embodiment of the edging system.

In a yet further embodiment of the edging system post 74 has a diameter smaller than the diameter of joint aperture 80, thereby permitting joint 70 to be positioned through aperture 80 at a plurality of angles relative to a plane defined by side portion 64. This feature of the invention permits adjacent edging pieces to be interlocked at angles relative to each other to facilitate the creation of a landscape edge that describes curves or irregular shapes. FIG. 3 depicts a plurality of edging pieces 10 joined to each other via the aforementioned joint 70 and aperture 80 arrangement whereby the entire assembly produces a curved landscape edge. Since interlocking flange 26 extends outwardly to overlap relief portion 40 of an adjacent edging piece 10, the pieces may readily be positioned at relative angles to each other while maintaining a consistent outward appearance along the length of the assembly.

Figure 4:
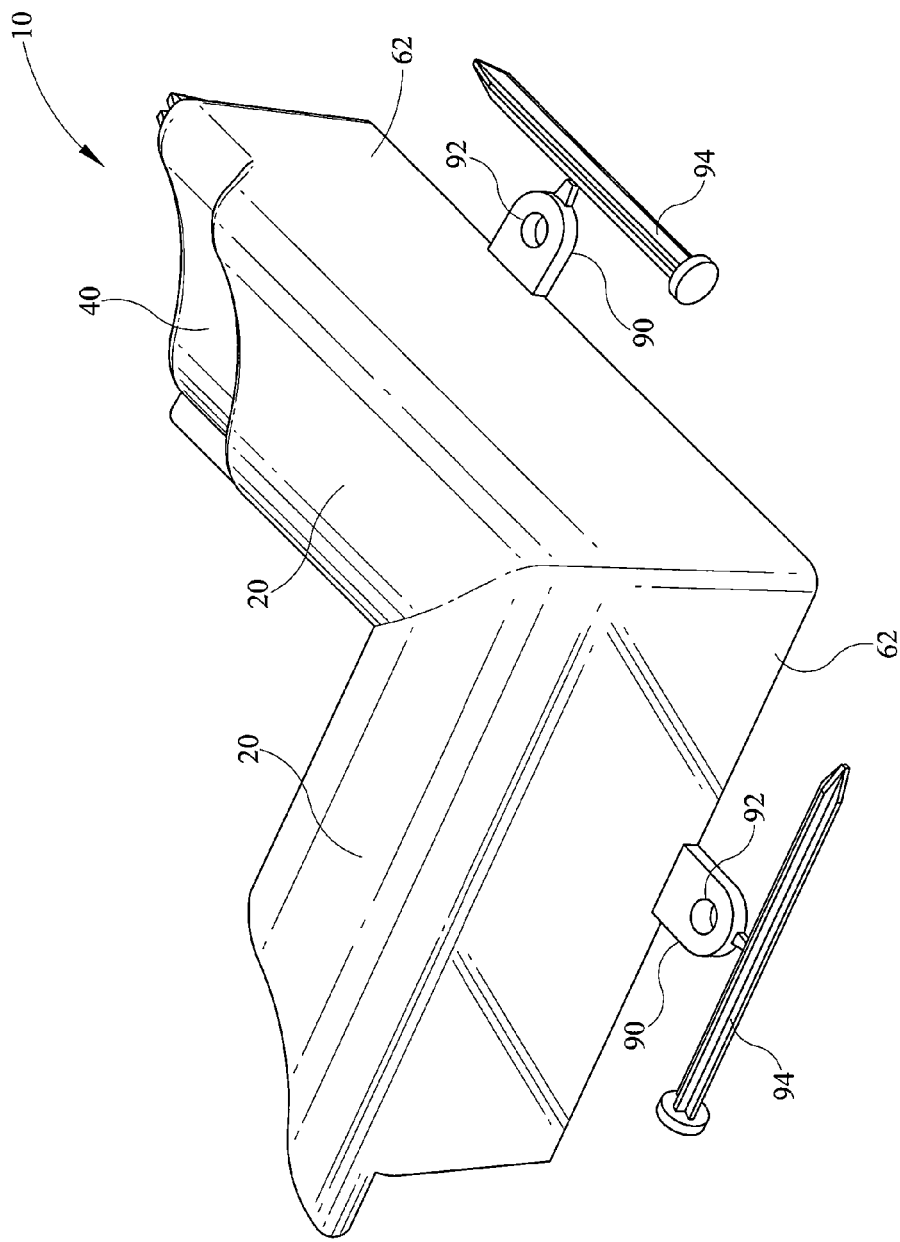
FIG. 4 is an isometric view of an inside corner landscape edging piece in accordance with one embodiment of the edging system.
Figure 5:
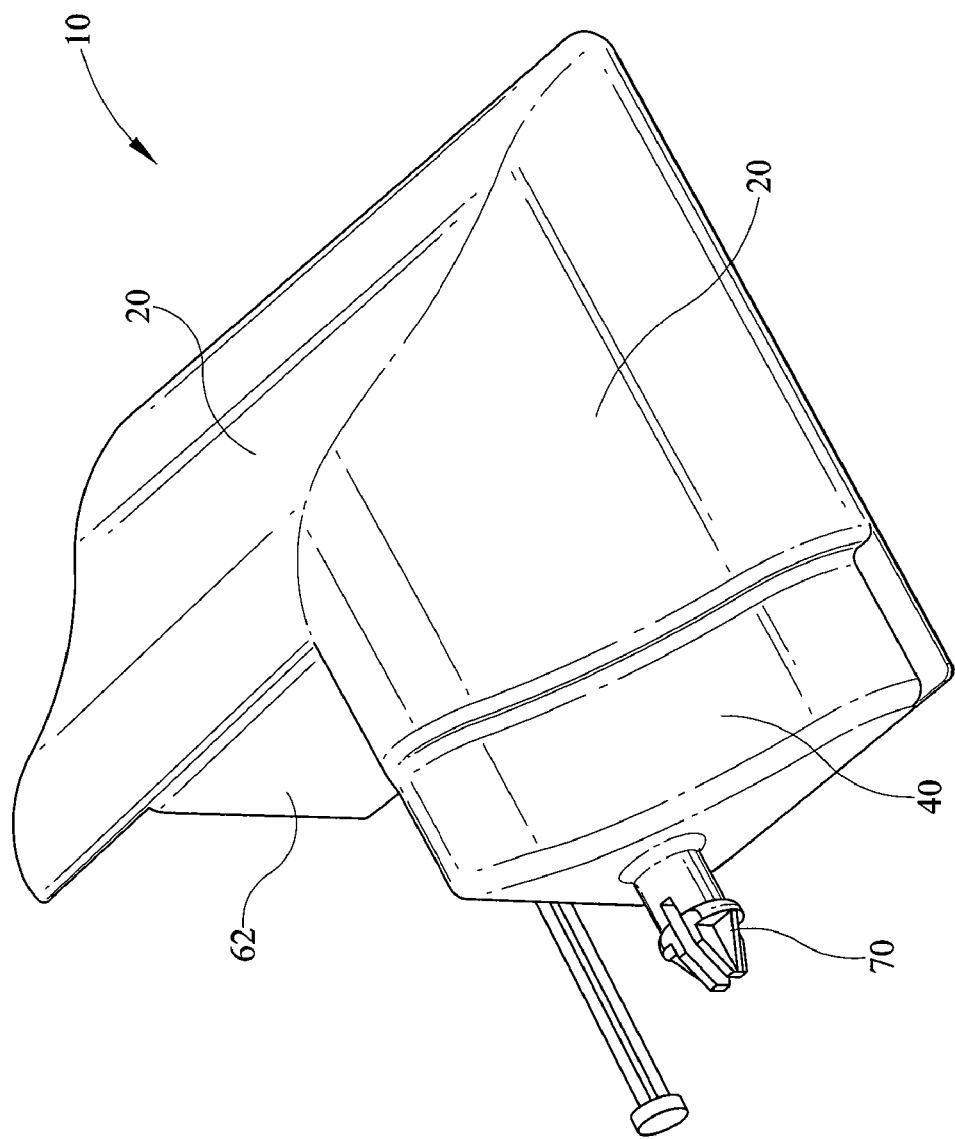
FIG. 5 is an isometric view of an outside corner landscape edging piece in accordance with one embodiment of the edging system.
Figure 6:
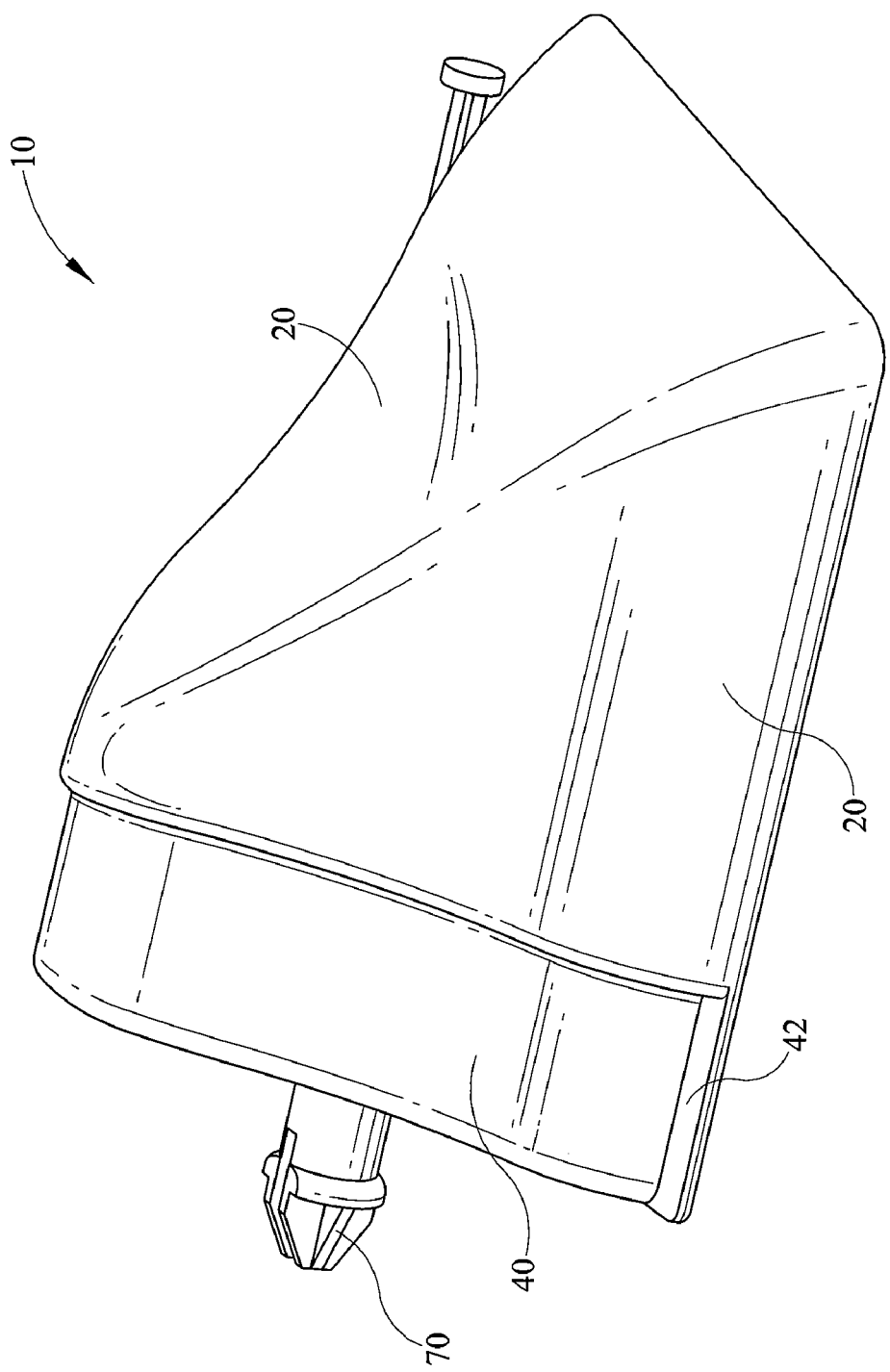
FIG. 6 is an isometric view of an end landscape edging piece in accordance with one embodiment of the edging system.

Referring to FIGS. 4, 5, and 6 there are shown a plurality of specialty edging pieces 10 for assembling square corners or terminating a landscape edge. FIG. 4 depicts an inside corner edging piece 10 having essentially the same features as previously described herein above. Face portion 20 extends around the inside corner of piece 10, while rear portion 62 extends around the exterior thereof. Similarly, FIG. 5 depicts an outside corner piece 10 wherein face portion 20 extends around the outside corner and rear portion 62 extends around the interior thereof.

FIG. 6 depicts an edging piece that 10 that functions as an end wherein face portion 20 is disposed on two sides of edging piece 10 to provide a uniform aesthetic appearance at the terminus of the landscape edging. Of course, one of ordinary skill in that art will recognize that while the corner pieces 10 depicted in FIGS. 4 and 5 are shown as ninety-degree corners, a variety of corner angles may be produced to permit custom configurations of the landscape edging system. Furthermore, individual edging pieces 10 may be molded to describe inside or outside curves of varying radii, to facilitate the construction of curved landscape edging.

Referring now to FIGS. 2 and 4, edging pieces 10 may further comprise an anchor tab 90 having an anchor aperture 92 therein. Anchor tab 90 is molded integral to and extends from rear portion 62. Furthermore, a detachable anchor 94 may be integrally molded with anchor tab 90. Alternatively, detachable anchor 94 may be integrally molded and secured to edging piece 10 at any point, since detachable anchor 94 is removed for use. In operation, anchor 90 is simply twisted to separate it from edging piece 10 then inserted through anchor aperture 92 and forced into the ground to secure edging piece 10 thereto. As best seen in FIG. 4, a plurality of anchor tabs 90 and detachable anchors 94 may be integrally molded into an edging piece 10 to provide anchor points at a plurality of locations and thus provide a more stable and secure landscape edge.

While the instant edging system has been shown and described herein in what are considered to be the preferred embodiments thereof, illustrating the results and advantages over the prior art obtained through the system, the invention is not limited to those specific embodiments. Thus, the forms of the apparatus and system shown and described herein are to be taken as illustrative only and other embodiments may be selected without departing from the scope of thereof, as set forth in the claims appended hereto.

I claim:

1. A landscape edging system comprising: a plurality of interlocking edging pieces comprising; a face portion having top and bottom edges and an integral interlocking flange; a relief portion adjacent said face portion and set in relief therefrom whereby the interlocking flange of one edging piece engages said relief portion of an adjacent edging piece, wherein said edging pieces further comprise a plurality of supports extending downwardly from the top edge of said face portion for supporting said edging pieces, wherein a first support forms a first side of said edging piece proximate the interlocking flange and a second support forms a second side of said edging piece proximate said relief portion; an aperture in the first side of said edging piece; and a joint extending outwardly from the second side of said edging piece wherein the joint of one edging piece engages the aperture of a second edging piece.

2. A landscape edging system as claimed in claim 1 wherein said first and second sides are disposed in generally parallel spaced relation.

3. A landscape edging system as claimed in claim 1 wherein said joint further comprises:
   a circular flange depending from a post, the circular flange having a slot therein.

4. A landscape edging system as claimed in claim 3 wherein said circular flange has a diameter slightly larger than the diameter of said aperture.

5. A landscape edging system as claimed in claim 4 wherein the post has a diameter smaller than the diameter of the aperture, whereby adjacent edging pieces may be positioned at relative angles to each other.

6. A landscape edging system as claimed in claim 2 further comprising;
   an anchor tab extending outwardly from said plurality of rear supports, said anchor tab having an aperture therein to accept an anchor.

7. A landscape edging system comprising: a plurality of interlocking edging pieces secured together and capable of articulation, each edging piece having a face portion and a relief portion, said face portion overlapping a relief portion of an adjacent edging piece; a contoured face portion on each of said edging pieces, the face portion supported by a pair of opposed sides, wherein the face portion is visible when said edging system is installed; and a radial joint extending from one of the opposed sides and an aperture disposed in the other opposed side, wherein the joint of a first edging piece is received within the aperture of an adjacent edging piece to secure the edging pieces together.

8. A landscape edging system as claimed in claim 7 further comprising:
   at least one corner edging piece capable of being secured to said plurality of interlocking edging pieces.

9. A landscape edging system as claimed in claim 8 wherein said corner edging piece is an inside corner.

10. A landscape edging system as claimed in claim 8 wherein said corner edging piece is an outside corner.

11. A landscape edging system as claimed in claim 7 further comprising:
    a rear portion extending downwardly from said face portion for enclosing the rear of each edging piece.

12. A landscape edging system as claimed in claim 7 wherein the face portion comprises a curved surface.

13. A landscape edging system as claimed in claim 7 wherein the relief portion comprises a curved surface.

* * * * *

UNITED STATES PATENT AND TRADEMARK OFFICE
CERTIFICATE OF CORRECTION

PATENT NO. : 7,596,903 B1  Page 1 of 1
APPLICATION NO. : 11/361735
DATED : October 6, 2009
INVENTOR(S) : Michael Shane Flanagan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Twenty-eighth Day of September, 2010

David J. Kappos
*Director of the United States Patent and Trademark Office*